Feb. 23, 1960   J. H. HUMBER ET AL   2,926,297
TEMPERATURE COMPENSATING MEANS FOR A GENERATOR
Filed Nov. 7, 1957

INVENTORS
JOHN H. HUMBER
HAIG KALFAIAN

BY *Herbert L. Davis*

ATTORNEY

United States Patent Office 2,926,297
Patented Feb. 23, 1960

2,926,297

TEMPERATURE COMPENSATING MEANS FOR A GENERATOR

John H. Humber, Glen Rock, and Haig Kalfaian, Lodi, N.J., assignors to Bendix Aviation Corporation, Teterboro, N.J., a corporation of Delaware Application November 7, 1957, Serial No. 694,961

6 Claims. (Cl. 322—33)

This invention relates to a novel method and improved means for compensating an A.C. tachometer generator for wide variance in prevailing temperature conditions.

Heretofore, it has been customary in the prior art to use a thermistor and shunt network in series with the primary winding of a tachometer generator to compensate the generator for changes in the prevailing temperature. The thermistor may be an element of a suitable carbon alloy having a negative temperature coefficient of resistance and has been found to provide good temperature compensation only over a relatively narrow temperature range so that under very low ambient temperature conditions well below such relatively narrow temperature range the voltage output from the generator has a tendency to increase due to the fact that the thermistor resistance under such very low ambient temperature conditions increases to a resistance many times greater than that under normal room temperature conditions within the predetermined temperature compensating range of the thermistor. Thus under such low temperature conditions the thermistor is in effect an open circuit and the compensating circuit is no longer temperature sensitive.

An object of the invention is to provide novel means to introduce heat into the tachometer generator, sufficient to raise the temperature of the generator and thermistor to within the normal temperature compensating range of the thermistor and thereby bring the output voltage of the tachometer generator (in phase and quadrature) to within the specified value for normal operation. It has been found that when the thermistor temperature compensation network is properly designed, heat need not be supplied until the ambient temperature is somewhat below normal room temperature.

Another object of the invention is to provide a heater control circuit including a snap action switch thermostat to control a main generator heater, together with an auxiliary heater in close proximity to the thermostat switch and so arranged as to cause the switch to act as a timer for the main heater. The thermostatic switch is so arranged as to be sensitive to the auxiliary heater temperature and the housing temperature so as to vary the timed heating interval in inverse relation to the ambient temperature.

These and other objects and features of the invention are pointed out in the following description in terms of the embodiment thereof which is shown in the drawings. It is to be understood, however, that the drawings are for the purpose of illustration only and are not a definition of the limits of the invention, reference being had to the appended claims for this purpose.

Figure 1:
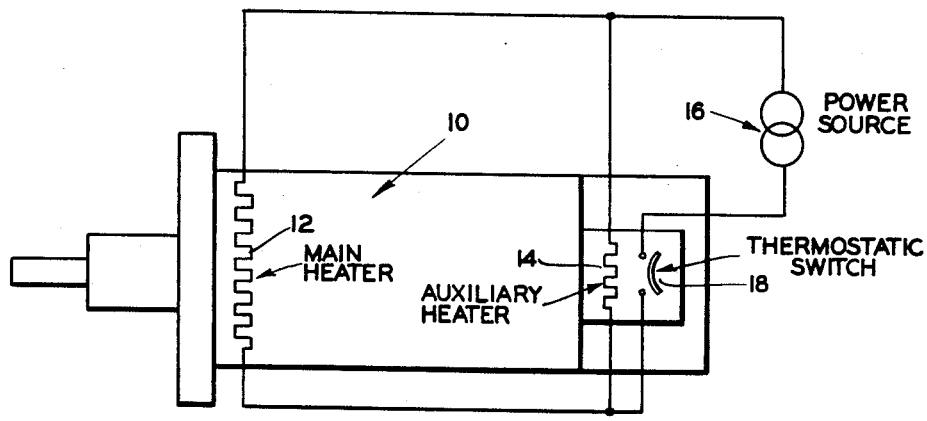
Figure 1 is a schematic view showing the main heater and timing circuit for a tachometer generator.

Referring to the drawing of Figure 1, there is indicated by the numeral 10 a tachometer generator of conventional type having a main heater 12 and an auxiliary heater 14 connected parallel thereto. Connected across the input to the main heater 12 and the auxiliary heater 14 is a suitable source of electrical energy indicated by numeral 16 and controlled by a snap action thermostatic switch 18 of conventional type operably positioned in close proximity to the auxiliary heater 14 and so arranged that upon the housing temperature of the tachometer generator 10 dropping below a predetermined value, the thermostatic switch 18 closes with a snap action the input circuit to the main heater 12 and auxiliary heater 14. Thereupon the temperature adjacent the switch 18 increases and upon the temperature increasing to a predetermined value the thermostatic switch 18 will open with a snap action the input circuit to the several heaters.

The thermostatic switch 18 is sensitive to the housing temperature of the generator 10 as well as the temperature of the auxiliary heater 14 and is so arranged that as the ambient temperature increases the time interval for energization of the main heater 12 decreases.

Figure 2:
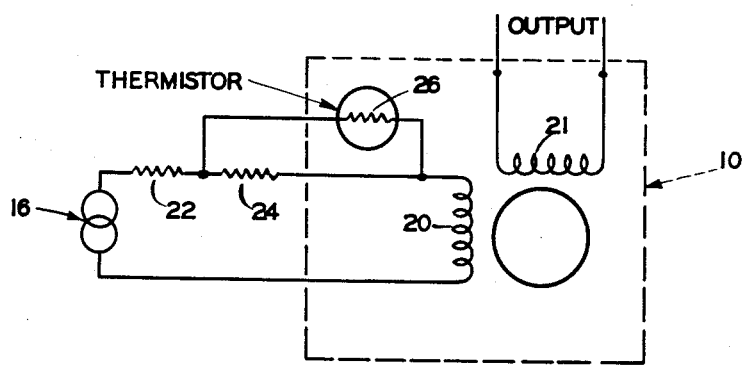
Figure 2 is a schematic drawing of the energizing circuit for the tachometer generator showing a thermistor temperature compensating network and the primary energizing circuit of the generator.

Further, as shown schematically in Figure 2, the generator 10 has a primary winding 20 and secondary winding 21 which windings have a positive temperature coefficient of resistance. The input circuit to the primary winding 20 is connected to the power source 16 and in the input circuit are resistor elements 22 and 24. Connected across the resistor element 24 is a thermistor 26 of conventional type. The thermistor 26 may be an element formed of a suitable carbon alloy and having a negative temperature coefficient of resistance while resistor element 24 has a low temperature coefficient of resistance and serves to calibrate the compensating circuit. The thermistor 26 provides good temperature compensation only over a relatively narrow temperature range extending from above 85° C. down through the normal room operating temperatures to somewhat below such temperatures such as for example −10° C. Thus, the thermistor network in the primary circuit of the generator 10 may be considered to compensate properly for the temperatures within this relatively narrow temperature range.

However, when the ambient temperature is at extremely low temperatures below such temperature compensating range, the thermistor 26 is no longer capable of proper temperature compensation, since its resistance at such low temperatures becomes much greater than that under normal room temperature conditions and within the temperature compensating range of the thermistor 26.

In effect the thermistor resistor 26 under such extremely low temperatures becomes in effect an open circuit and the compensating circuit becomes no longer temperature sensitive. Under such low ambient temperature conditions the output voltages across the secondary winding 21 of the generator 10 has a tendency to increase and while the in-phase output voltage may be very close to standard values, there inherently exists a large quadrature error in such output voltage. It has been found that the most effective way to reduce this voltage error is to introduce heat into the tachometer generator as by the main heater 12 so as to bring the output voltage across the secondary winding 21 (in phase and quadrature) to that desired.

In the arrangement of Figure 1, the closing temperature for the thermostatic switch 18 is arranged so as to be somewhat higher than the lower limit of the temperature compensating range of the thermistor temperature compensator 26, but such thermostat closing temperature is so selected as to be below normal room temperatures.

Thus, under such an arrangement when the ambient temperature is at an extremely low value of, for example, −55° C., the thermostatic switch 18 is closed permitting current to flow from the source 16 through the main heater 12 and auxiliary heater 14. Such energizing current will continue to flow until the auxiliary heater 14 heats the thermostatic switch 18 sufficiently to cause it to open the circuit from the power source 16.

Upon opening the heating circuit the thermostatic switch 18 then cools until the temperature it senses is low enough to cause it to snap on and close the energizing circuit to the respective heaters 12 and 14. As a result, a definite time cycle will be produced by the thermostatic switch 18 varying inversely with the prevailing ambient temperature.

Thus, if the prevailing ambient temperature is increased, the heating time will be decreased so that less heat will necessarily be supplied to the tachometer generator 10. In effect, an ambient temperature vs. average heater wattage characteristics will be obtained which will bring the unit into calibration at all temperatures. By proper selection of main and auxiliary heater powers and closing and opening temperatures of the thermostatic switch 18, a high precision, wide temperature range and low output cycling tachometer will result.

Although only one embodiment of the invention has been illustrated and described, various changes in the form and relative arrangements of the parts, which will now appear to those skilled in the art, may be made without departing from the scope of the invention. Reference is, therefore, to be had to the appended claims for a definition of the limits of the invention.

What is claimed is:

1. Temperature compensating means for a generator having a housing, an input exciting winding and an output winding, comprising means for conducting electrical energy from a source of electrical energy to the input exciting winding, said conducting means including an element having an electrical resistance varying with prevailing temperature of the generator housing and arranged to compensate within a limited range of temperatures for changes in said prevailing temperature, heater means for increasing the temperature within the housing of the generator, and temperature responsive means for controlling said heating means so as to maintain the temperature of the generator housing within said limited range of temperatures.

2. The combination defined by claim 1 in which said temperature responsive means includes a thermostatic control means, an auxiliary heater to render inoperative the thermostatic control means, and said thermostatic control means responsive to the prevailing temperature of the generator housing and rendered operative thereby to simultaneously effect operation of the generator heating means and the auxiliary heating means for intervals of time varying inversely with ambient air temperature about the generator housing.

3. For use with a tachometer generator having a housing, an input exciting winding and an output winding, and each of said windings having a positive temperature coefficient of resistance; the combination comprising a source of electrical energy, means for conducting electrical energy from said source to the input exciting winding, said conducting means including an element having a negative temperature coefficient of resistance, said element so arranged as to compensate within a limited range of temperatures for variance in the resistance of the aforesaid windings upon changes in prevailing temperature of the housing of said generator, a main heater resistor for applying heat directly to the generator housing, a snap action thermostatic switch, an auxiliary heater resistor, said main and auxiliary heater resistors energized upon operation of the snap action thermostatic switch in a closing sense upon a decrease in the prevailing temperature of the generator housing below a predetermined value and a value within said limited range of temperatures, an auxiliary heater resistor positioned in an operative relation to said thermostatic switch to cause operation of the snap action thermostatic switch in an opening sense upon energization of the auxiliary heater resistor and increase in the effective temperature to a predetermined value and a value within said limited range of temperatures, and said snap action thermostatic switch responsive to the prevailing temperature of the generator housing and rendered operative in said opening and closing senses for intervals of time varying inversely with ambient air temperatures about the generator housing.

4. In temperature compensating a generator of a type having an exciting winding, a housing for the generator, and temperature responsive means to vary the electrical resistance of at least a portion of an input circuit to the exciting winding so as to compensate the generator over a limited temperature range for changes in the prevailing temperature of the generator housing; an improved method comprising the steps of applying heat directly to the generator housing upon the temperature thereof decreasing below a predetermined temperature value within said limited temperature range, and discontinuing the application of said heat to the generator housing upon the temperature thereof increasing above a predetermined temperature value within said limited temperature range.

5. The improved method defined by claim 4 including the additional step of varying the time interval of application of the heat to the generator housing inversely with change in ambient air temperatures about the generator housing.

6. In a method for temperature compensating a generator of a type having a housing for the generator, an exciting winding and an input circuit for energizing the exciting winding, an output winding inductively coupled thereto, and the resistance of which windings vary directly with change in the prevailing temperatures thereof; comprising the steps first of varying the electrical resistance of at least a portion of said input circuit inversely with change in the prevailing temperature within the generator housing so as to compensate for the effect of such change on the resistance of said generator windings over a limited temperature range, second applying heat within the generator housing so as to maintain the prevailing temperature thereof within said limited temperature range, and third varying the interval of application of heat within the generator housing inversely with change in ambient temperatures of air surrounding the generator housing.

References Cited in the file of this patent

UNITED STATES PATENTS

| | | |
|---|---|---|
| 339,773 | Hering | Apr. 13, 1886 |
| 1,874,163 | Gergvall | Aug. 30, 1932 |
| 2,088,617 | Sola | Aug. 3, 1937 |
| 2,347,563 | Keller | Apr. 25, 1944 |